(12) United States Patent
Johnson et al.

(10) Patent No.: US 11,334,406 B2
(45) Date of Patent: May 17, 2022

(54) SYSTEMS AND METHODS OF PRESENTING DIAGNOSTIC INFORMATION OF AN ELECTRONIC DEVICE AT DIAGNOSTIC EQUIPMENT

(71) Applicant: Lenovo Enterprise Solutions (Singapore) Pte. Ltd., New Tech Park (SG)

(72) Inventors: Jarrod B. Johnson, Research Triangle Park, NC (US); Ross Lee Mickens, Research Triangle Park, NC (US); Matthew Allen Steele, Research Triangle Park, NC (US); Andrew Hamilton Wray, Research Triangle Park, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 260 days.

(21) Appl. No.: 16/682,036

(22) Filed: Nov. 13, 2019

(65) Prior Publication Data
US 2021/0141680 A1 May 13, 2021

(51) Int. Cl.
*G06F 11/00* (2006.01)
*G06F 13/42* (2006.01)
*G06F 9/451* (2018.01)

(52) U.S. Cl.
CPC ........ *G06F 11/006* (2013.01); *G06F 13/4282* (2013.01); *G06F 9/451* (2018.02); *G06F 2201/86* (2013.01); *G06F 2213/0042* (2013.01)

(58) Field of Classification Search
CPC ....................................................... Y02P 80/10
See application file for complete search history.

(56) References Cited

U.S. PATENT DOCUMENTS

| | | | |
|---|---|---|---|
| 7,865,781 B2 | 1/2011 | Fox et al. | |
| 8,069,374 B2 | 11/2011 | Panigrahy et al. | |
| 9,398,848 B2 | 7/2016 | Hansen | |
| 2004/0199282 A1 | 10/2004 | Cabezas et al. | |
| 2011/0241833 A1* | 10/2011 | Martin | G08C 21/00 340/10.1 |
| 2017/0012448 A1* | 1/2017 | Miller | H02J 7/342 |
| 2017/0169401 A1* | 6/2017 | Beane | H04W 24/00 |

\* cited by examiner

*Primary Examiner* — Henry Tsai
*Assistant Examiner* — Juanita Borromeo
(74) *Attorney, Agent, or Firm* — Olive Law Group, PLLC

(57) ABSTRACT

Systems and methods of presenting diagnostic information of an electronic device at diagnostic equipment are disclosed. According to an aspect, a system includes an input/output interface configured to communicatively connect to diagnostic equipment and configured to receive electrical power from the diagnostic equipment. Further, the system includes a diagnostic module that stores diagnostic information of an electronic device. The diagnostic module determines that the diagnostic equipment is connected to the input/output interface. The diagnostic module is configured to determine that electrical power is not available from a power supply of the electronic device. Further, the diagnostic module is configured to receive the electrical power from the diagnostic equipment and use the electrical power from the diagnostic equipment to communicate the stored diagnostic information to the diagnostic equipment in response to the diagnostic equipment being connected to the input/output interface and the electrical power not being available from the power supply.

20 Claims, 8 Drawing Sheets

FIG. 8

SYSTEMS AND METHODS OF PRESENTING DIAGNOSTIC INFORMATION OF AN ELECTRONIC DEVICE AT DIAGNOSTIC EQUIPMENT

TECHNICAL FIELD

The presently disclosed subject matter relates generally to computer diagnostics. Particularly, the presently disclosed subject matter relates to systems and methods of presenting diagnostic information of an electronic device at diagnostic equipment.

BACKGROUND

Many electronic devices include systems and subcomponents that monitor system health. These systems and subcomponents can generate related information and store the information in memory. This information may be stored as diagnostic information, because it may be accessed by and helpful to a technician or other personnel for diagnosis of errors or other problems of the electronic device. Example diagnostic information includes log data, last-known metrics, and currently-relevant fault conditions.

A server residing at a data center is type of electronic device that can have a diagnostic subcomponent or module that monitors system health of the server. In the instance of an error, failure, or other problem with the server, a technician may be notified or the problem and then go to the server to determine the source of the problem. The technician often carries diagnostic equipment that connects to the server for retrieval of diagnostic information. The diagnostic information and/or analysis information may then be presented to the technician. Based on this information, the technician may then determine how to correct the server problem. The server problem may be corrected by, for example, reconfiguring the server, replacing a component of the server, or repairing a component of the server.

In some instances, a technician may be unable to use his or her diagnostic equipment to retrieve diagnostic information from a server. For example, a diagnostic subcomponent or module may experience power loss such that it cannot communicate the diagnostic information to the diagnostic equipment. This scenario can encumber the technician and reduce his or her ability to repair the server. Accordingly, there is a need for improved systems and techniques for technicians to diagnose problems with electronic devices, particularly servers.

SUMMARY

The presently disclosed subject matter provides systems and methods of presenting diagnostic information of an electronic device at diagnostic equipment. According to an aspect, a system includes an input/output interface configured to communicatively connect to diagnostic equipment and configured to receive electrical power from the diagnostic equipment. Further, the system includes a diagnostic module configured to store diagnostic information of an electronic device. Further, the diagnostic module is configured to determine that the diagnostic equipment is connected to the input/output interface. The diagnostic module is also configured to determine that electrical power is not available from a power supply of the electronic device. Further, the diagnostic module is configured to receive the electrical power from the diagnostic equipment and use the electrical power from the diagnostic equipment to communicate the stored diagnostic information to the diagnostic equipment in response to the diagnostic equipment being connected to the input/output interface and the electrical power not being available from the power supply of the electronic device.

BRIEF DESCRIPTION OF THE DRAWINGS

Figure 1:
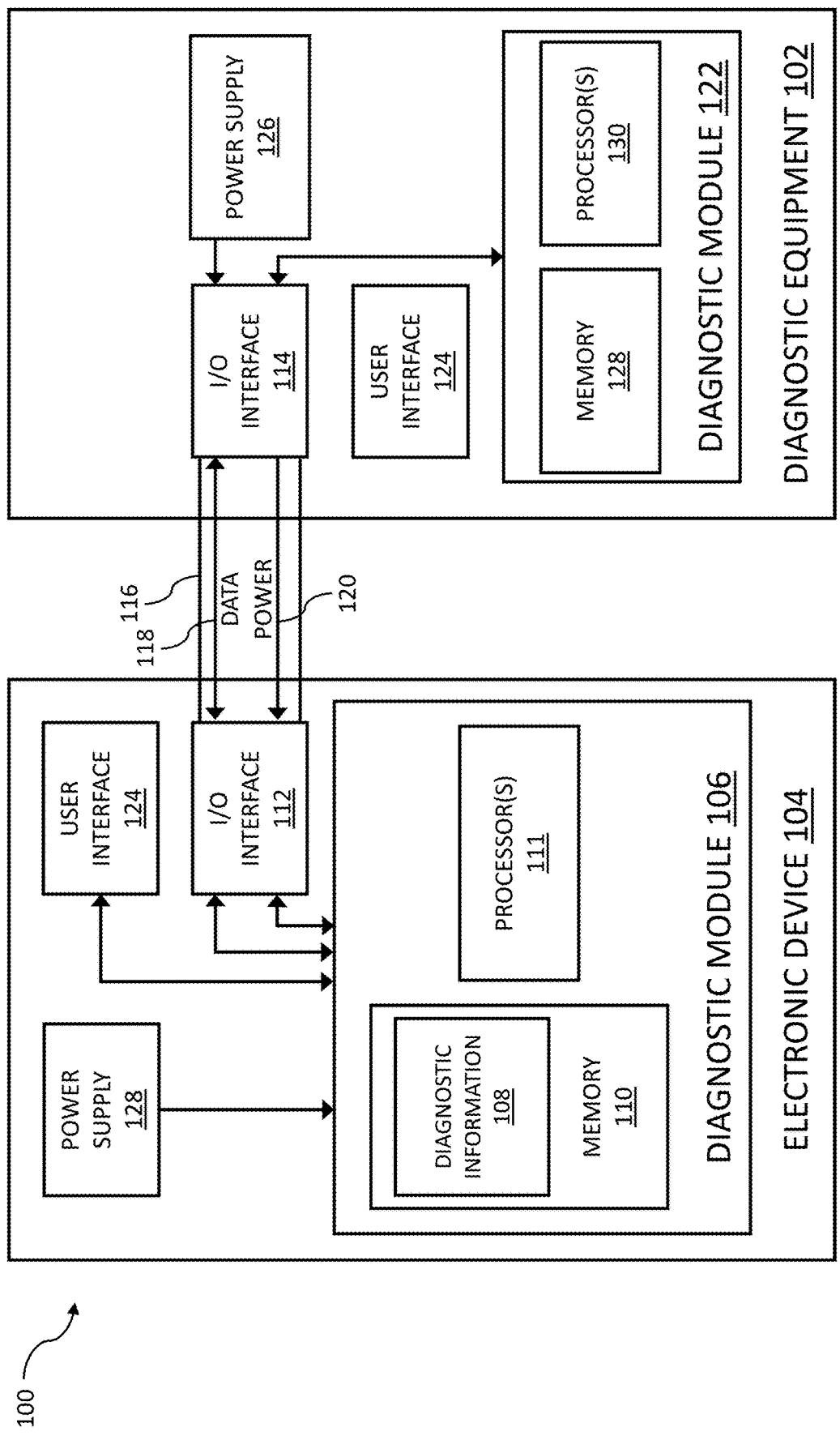
Figure 2:
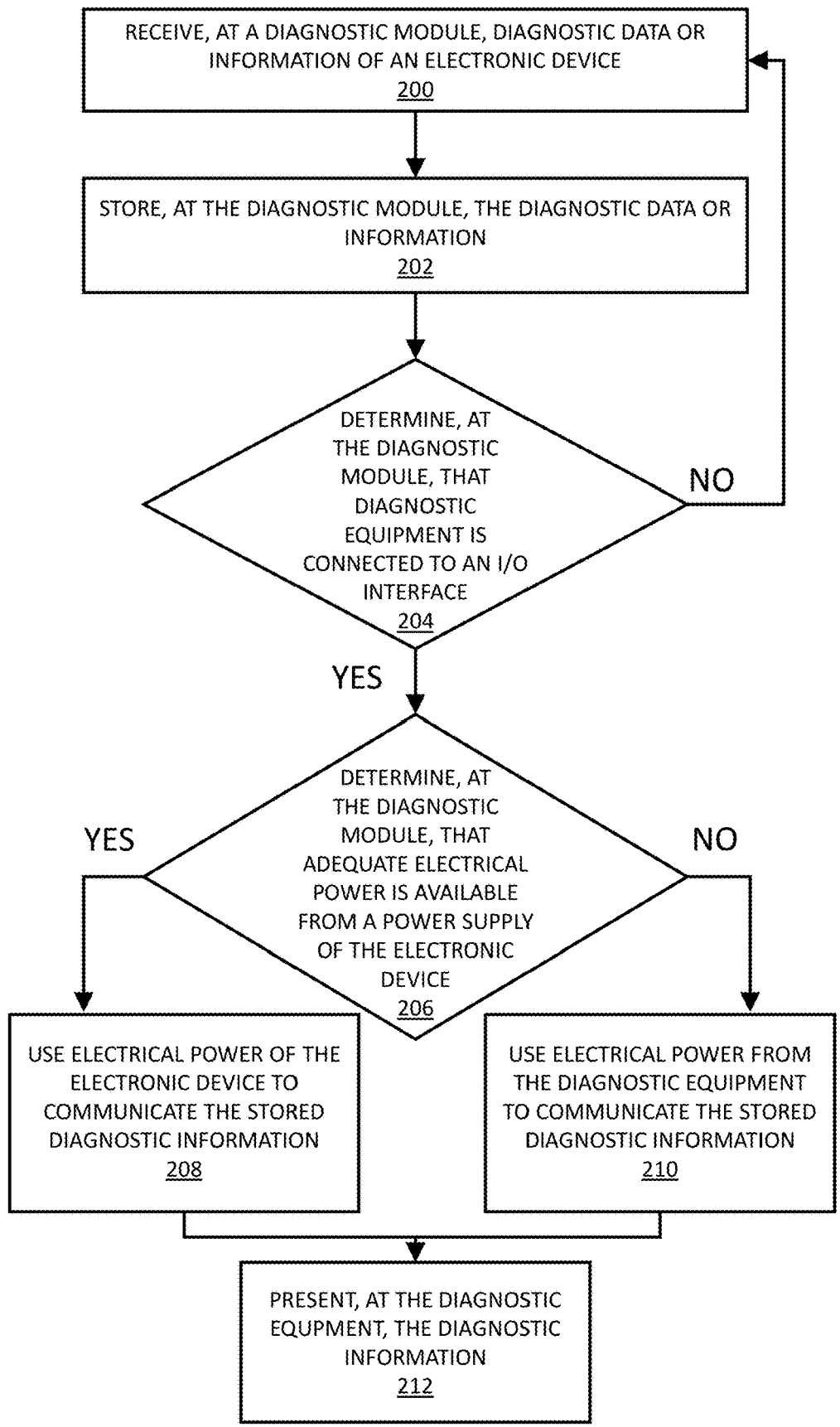
Figure 3:
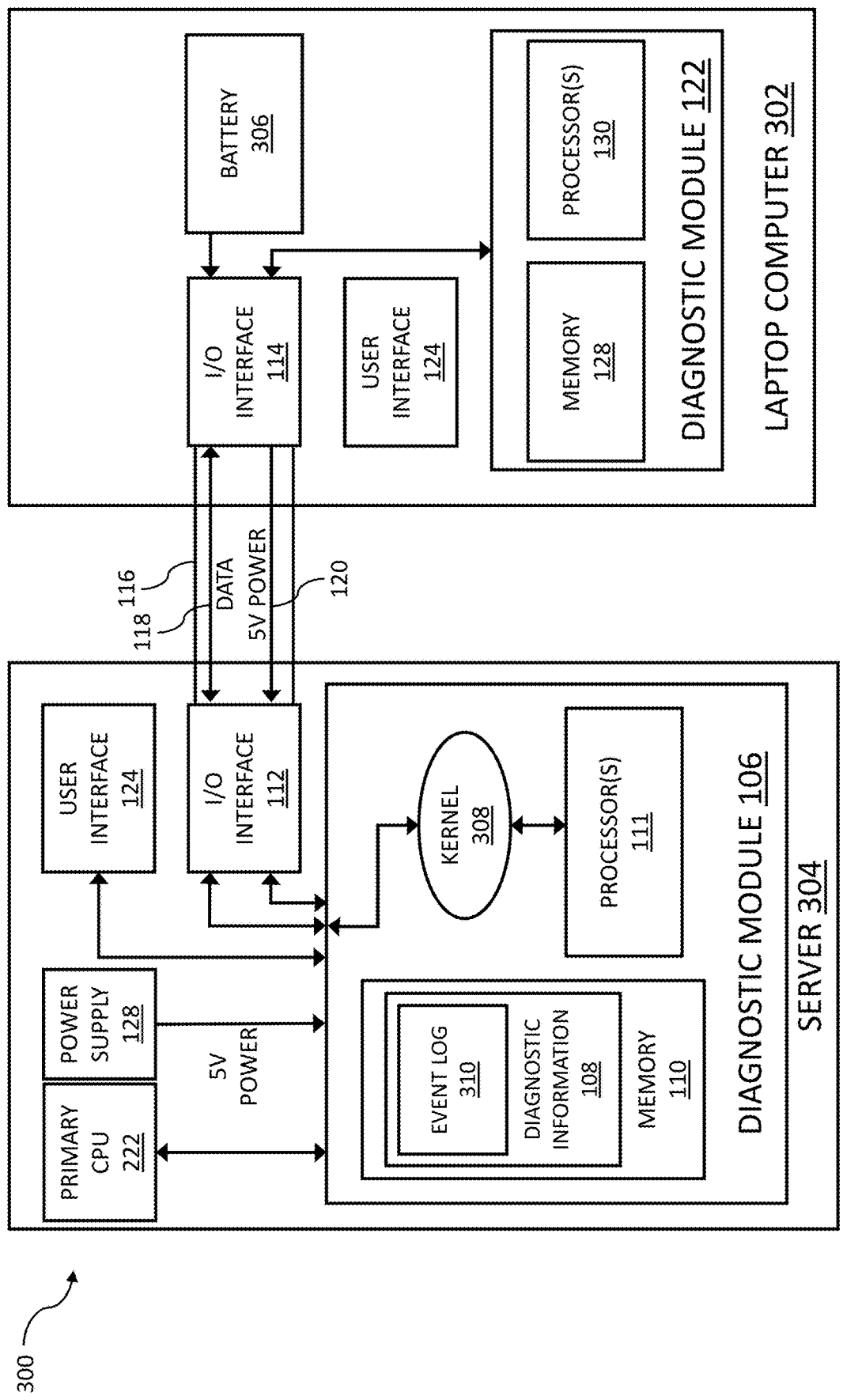
Figure 4:
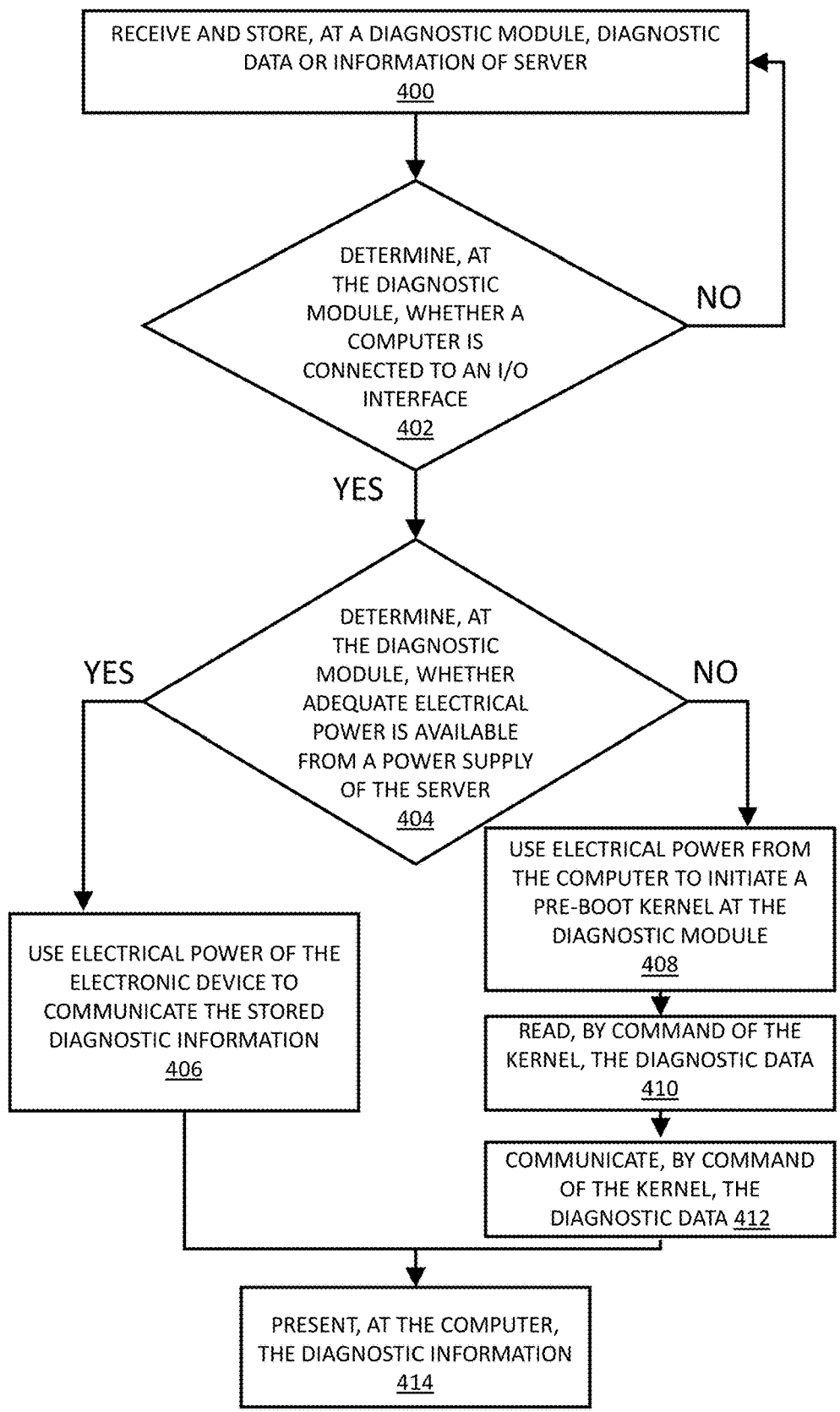
Figure 5:
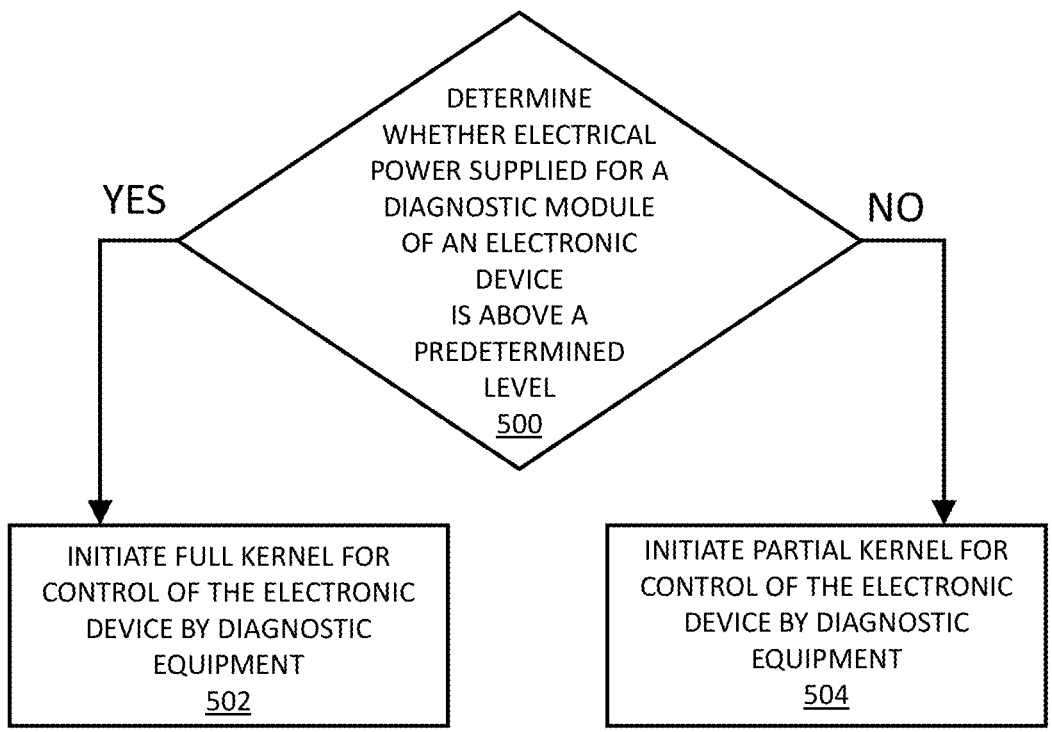
Figure 6:
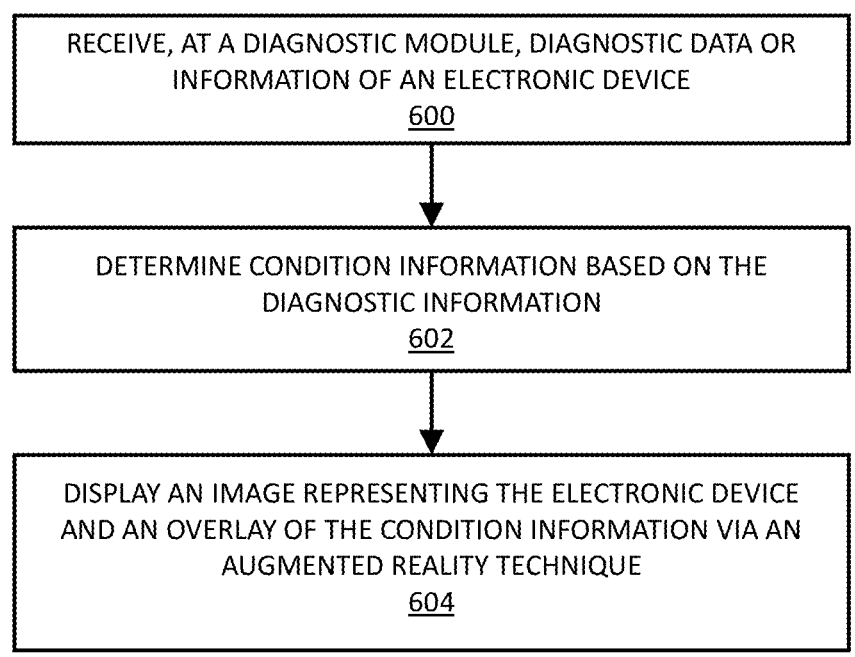
Figure 7:
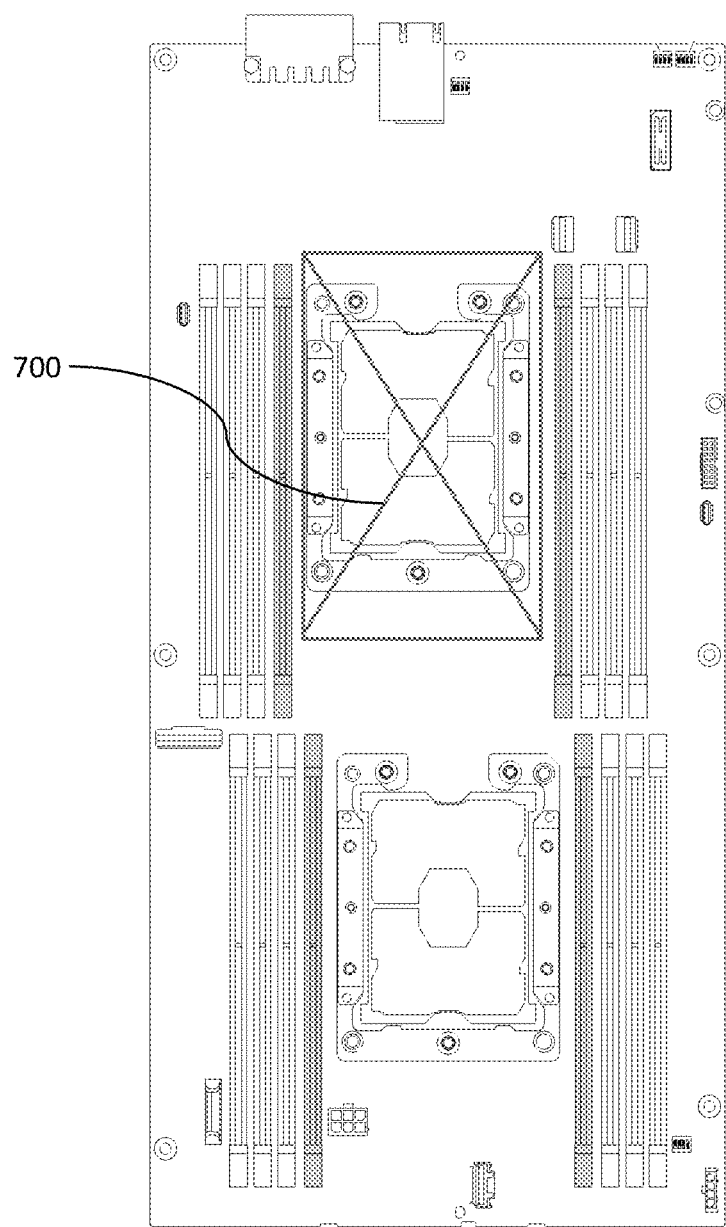

Having thus described the presently disclosed subject matter in general terms, reference will now be made to the accompanying Drawings, which are not necessarily drawn to scale, and wherein:

FIG. 1 is a block diagram of an example system that can provide power from diagnostic equipment to an electronic device for communication of diagnostic information in accordance with embodiments of the present disclosure;

FIG. 2 is a flow diagram of an example method of providing power from diagnostic equipment to an electronic device for communication of diagnostic information in accordance with embodiments of the present disclosure;

FIG. 3 is a block diagram of an example system that can provide power from a laptop computer to a server for communication of diagnostic information from the server to the laptop computer in accordance with embodiments of the present disclosure;

FIG. 4 is a flow diagram of an example method of providing power from a laptop computer to a server for communication of diagnostic information to the laptop computer in accordance with embodiments of the present disclosure;

FIG. 5 is a flow diagram of an example method for initiating a kernel with different functionality for accessing diagnostic information based on power supply in accordance with embodiments of the present disclosure;

FIG. 6 is a flow diagram of an example method to display an image representing an electronic device and an overlay of condition information via an augmented reality technique;

FIG. 7 is a displayed representation of internal components of a server; and FIG. 8 is a screen display providing example diagnostic and condition information in accordance with embodiments of the present disclosure.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

As referred to herein, the term "electronic device" should be broadly construed. It can include any type of device including hardware, software, firmware, the like, and combinations thereof. An electronic device may include one or more processors and memory or other suitable non-transitory, computer readable storage medium having computer readable program code for implementing methods in accordance with embodiments of the present disclosure. An electronic device may be a computer, such as server. In other examples, a computing device can be any type of conventional computer such as a laptop computer or a tablet computer.

As used herein, the term "memory" is generally a storage device of a computing device. Examples include, but are not limited to, read-only memory (ROM) and random access memory (RAM).

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

FIG. 1 illustrates a block diagram of an example system 100 that can provide power from diagnostic equipment 102 to an electronic device 104 for communication of diagnostic information in accordance with embodiments of the present disclosure. Referring to FIG. 1, the electronic device 104 may be a server, a desktop computer, a laptop computer, a tablet computer, a router, a switch, a smartphone, or any other electronic device having a diagnostic module 106 configured to monitor health of the electronic device. The diagnostic module 106 may acquire, detect, or receive health-related information from components of the electronic device 104. For example, a component of electronic device 104 may fail, and the diagnostic module 106 may determine failure of the component based on data received from the component directly or by another component that interacts with the failed component. Indication of failure or other health-related condition of a component may be stored as diagnostic information 108 in memory 110 of the diagnostic module 106. Other example diagnostic information includes, but is not limited to, event logs, metrics, temperature, voltage states, physical shock levels, humidity measurements, fault conditions, moisture exposure information, state information of components of the electronic device, and the like. The diagnostic module 106 may include hardware, software, firmware, various other electronic components, or combinations thereof for implementing the functionality described herein. For example, the diagnostic module 106 may include memory 110 and one or more processors 111 for implementing the functionality described herein.

Diagnostic equipment 102 may interface with the electronic device 104 via input/output (I/O) interfaces 112 and 114. I/O interfaces 112 and 114 may be a part of and integrated into electronic device 104 and diagnostic equipment 102, respectively. A cable 116 may operatively connect the I/O interfaces 112 and 114 for carrying data signals (represented by double arrow 118) between diagnostic equipment 102 and the electronic device 104. The cable 116 may also carry electrical power (represented by arrow 120) from the diagnostic equipment 102 to the electronic device 104. Further, the cable 116 may be manually connected to the I/O interfaces 112 and 114 as shown in FIG. 1, or manually disconnected from the I/O interfaces 112 and 114.

In operation when the cable 116 operatively connects I/O interfaces 112 and 114, diagnostic information 108 may be communicated via the cable 116 to the diagnostic equipment 102. Particularly, I/O interfaces 112 and 114 may operate together to communicate data signals 118 carrying the diagnostic information 108 to a diagnostic module 122, where the diagnostic information 108 is processed, analyzed, and presented to a technician or other operator via a user interface 124 of the diagnostic equipment 102. The diagnostic module 122 may include hardware, software, firmware, or combinations thereof for implementing the functionality described herein. For example, the diagnostic module 122 may include memory 128 and one or more processors 130.

In accordance with embodiments, diagnostic equipment 102 may include a power supply 126 (e.g., a battery) operable to deliver power to the electronic device 104 via the cable 116 and I/O interfaces 112 and 114. Power may be delivered to the electronic device 104 to power the diagnostic module 106 such that diagnostic information 108 can be communicated to the diagnostic module 122 of the diagnostic equipment 102. This may be needed, for example, in the instance that the electronic device 104 does not have sufficient power to retrieve the diagnostic information from memory 110 and/or to communicate the diagnostic information 108 to the diagnostic equipment 102. In the instance that there is sufficient power at the electronic module 104, a power supply 128 of the electronic device 104, for example, may provide power to retrieve the diagnostic information from memory 110 and/or to communicate the diagnostic information 108 to the diagnostic equipment 102. The power supply 128 may be a battery of the electronic device 104 or it may be power supplied by an external source, such as an electrical outlet.

FIG. 2 illustrates a flow diagram of an example method of providing power from diagnostic equipment to an electronic device for communication of diagnostic information in accordance with embodiments of the present disclosure. The method is described by example as being implemented by the system 100 shown in FIG. 1, although it should be understood that the method may alternatively be implemented by any other suitable system. Referring to FIG. 2, the method includes receiving 200, at a diagnostic module, diagnostic data or information of an electronic device. For example, various components and sensors of the electronic device 104 may generate diagnostic data or information, which may be acquired or communicated to the diagnostic module 106 of the electronic device 104 shown in FIG. 1. Example diagnostic data or information includes, but is not limited to, event logs, metrics, temperature, voltage states, physical shock levels, humidity measurements, fault conditions, moisture exposure information, state information of components of the electronic device, and the like. The method also includes storing 202, at the diagnostic module, the diagnostic data or information. Continuing the aforementioned example, the diagnostic module 106 may store received diagnostic data and/or information 108 in memory 110.

The method of FIG. 2 includes determining 204, at the diagnostic module, whether diagnostic equipment is connected to an I/O interface. In response to determining that diagnostic equipment is not connected to the I/O interface, the method proceeds to step 200. Otherwise, the method proceeds to step 206. Continuing the aforementioned example, the diagnostic module 106 can determine whether diagnostic equipment 102 is operatively connected to the I/O interface 112 of the electronic device 104. In an example of determining the connection, the diagnostic equipment 102 may communicate a signal via the data line 118 to indicate the connection. When present, a pull-up or pull-down resistor of the diagnostic equipment 102 can be used to provide a known and predetermined signal state to the diagnostic module 106. If the diagnostic module 106 determines that the diagnostic equipment 102 is not connected to the electronic device 104, then the diagnostic module 106 may continue monitoring whether the diagnostic equipment 102 is connected to the electronic device 104.

With continuing reference to FIG. 2, at step 206 the method includes determining, at the diagnostic module, whether adequate electrical power is available from a power supply of the electronic device. Returning to the aforementioned example, the diagnostic module 106 may be operatively connected to the power supply 128 for receipt of power to implement its functionality. The diagnostic module 106 may determine that the power supply 128 has failed or that it is otherwise not capable of providing sufficient power for the diagnostic module 106 to operate or at least communicate diagnostic information to the connected diagnostic equipment 102. In an example, the diagnostic module 106 may determine that the power supply 128 cannot provide adequate power to the diagnostic module 106 by testing voltage provided by the power supply 128. For example, a power level sensor or a line sense signal on the power supply wires into the diagnostic module 106 may be suitably used to determine whether the power supplied is adequate. In response to determining that adequate power is available from a power supply of the electronic device, the method may proceed to step 208. Otherwise, in response to determining that adequate power is unavailable from a power supply of the electronic device, the method may proceed to step 210.

At step 208 of FIG. 2, the method includes using 208, at the diagnostic module, electrical power of the electronic device to communicate the stored diagnostic information to the diagnostic equipment via the I/O interface. Continuing the aforementioned example, the diagnostic module 106 can use power provided by the power supply 128 to communicate the stored diagnostic information 108 to the diagnostic equipment 102 via the cable 116 and the I/O interfaces 112 and 114.

At step 210 of FIG. 2, the method includes using 210, at the diagnostic module, electrical power from the diagnostic equipment to communicate the stored diagnostic information to the diagnostic equipment via the I/O interface. Continuing the aforementioned example, the diagnostic module 106 can use power provided by the power supply 126 of the diagnostic equipment 102 to communicate the stored diagnostic information 108 to the diagnostic equipment 102 via the cable 116 and the I/O interfaces 112 and 114.

Subsequent to steps 208 and 210, the diagnostic equipment has received the stored diagnostic information. Following steps 208 and 210, the method includes presenting 212, at the diagnostic equipment, the diagnostic information. Continuing the aforementioned example, the diagnostic module 122 may control the user interface 124 to present the diagnostic information. The diagnostic information may be presented, for example, by a visual and/or audio technique. For example, the user interface 124 may include a display for displaying the diagnostic information as text and/or graphically. After receiving the diagnostic information, the diagnostic equipment 102 may request additional information and/or provide additional instructions to the diagnostic module 106. The presented information may be condition information for the electronic device 104 based on the diagnostic information. Example condition information may indicate a failed CPU, memory component, or the like. Further, an operator may physically disconnect the diagnostic equipment 102 from the electronic device 104 such as, for example, by disconnecting the cable from one or both of the I/O interface 112 and 114.

FIG. 3 illustrates a block diagram of an example system 300 that can provide power from a laptop computer 302 to a server 304 for communication of diagnostic information from the server 304 to the laptop computer 302 in accordance with embodiments of the present disclosure. Referring to FIG. 3, the server 304 includes a diagnostic module 106 configured to monitor health of the server 304. The diagnostic module 106 may acquire, detect, or receive health-related information from components of the server 304. For example, a component of server 304 may fail, and the diagnostic module 106 may determine failure of the component based on data received from the component directly or by another component that interacts with the failed component. Indication of failure or other health-related condition of a component may be stored as diagnostic information 108 in memory 110 of the diagnostic module 106.

Laptop computer 302 may interface with the server 304 via I/O interfaces 112 and 114. The cable 116 may operatively connect the I/O interfaces 112 and 114 for carrying data signals 118 between the laptop computer 302 and the server 304. The cable 116 may also carry electrical power 120 from the laptop computer 302 to the server 304.

In operation when the cable 116 operatively connects I/O interfaces 112 and 114, diagnostic information 108 may be communicated via the cable 116 to the laptop computer 302. The diagnostic module 222 may process, analyze and present the diagnostic information 108 to a technician or other operator via the user interface 124.

The laptop computer 302 includes a battery 306 operable to provide power to the server 304 via the cable 116 and I/O interfaces 112 and 114. Power may be delivered to the server 304 to power the diagnostic module 106 such that diagnostic information 108 can be communicated to the diagnostic module 122 of the laptop computer 302. This may be needed, for example, in the instance that the server 304 does not have sufficient power to retrieve the diagnostic information 108 from memory 110 and/or to communicate the diagnostic information 108 to the laptop computer 302. In the instance that there is sufficient power at the server 304, the power supply 128 of the server 304, for example, may provide power to retrieve the diagnostic information 108 from memory 110 and/or to communicate the diagnostic information 108 to the laptop computer 302. It is noted that in this example, the diagnostic module 106 may be an onboard management device of the server 302.

In accordance with embodiments, a technician may manually connect the laptop computer 302 to the server 304 via the cable 116 and I/O interfaces 112 and 114 in order to retrieve diagnostic information 108 from the server 304. This connection of the laptop computer 302 and the server 304 may initiate a boot kernel 308 for enabling the laptop computer 302 to access the diagnostic information 108 stored in the server 304. In an example, the boot kernel 308 may provide read only functionality such that the laptop computer 302 may only read the diagnostic information 108 from memory 110 of the server 304. The kernel 308 may operate on the processor(s) 111. Power for operating the kernel 308 to retrieve the diagnostic information 108 and to communicate the diagnostic information 108 may be provided by the battery 306 of the laptop computer 302. The power supplied by the battery 306 may be 5 Volts.

FIG. 4 illustrates a flow diagram of an example method of providing power from a laptop computer to a server for communication of diagnostic information to the laptop computer in accordance with embodiments of the present disclosure. The method is described by example as being implemented by the system 300 shown in FIG. 3, although it should be understood that the method may alternatively be implemented by any other suitable system. Referring to FIG. 4, the method includes receiving and storing 400, at a diagnostic module, diagnostic data or information of server. For example, event log data 310 may be generated and stored in the memory 110 of the server 304.

The method of FIG. 4 includes determining 402, at the diagnostic module, whether a computer is connected to an I/O interface. Continuing the aforementioned example, the laptop computer 302 and the server 304 may initially be disconnected from each other. Subsequently, a technician may connect the laptop computer 302 and the server 304 via the cable 116 and the I/O interfaces 112 and 114. In response to determining that a computer is not connected to the I/O interface, the method of FIG. 4 proceeds to step 400. Otherwise, the method of FIG. 4 proceeds to step 404. Continuing the aforementioned example, the diagnostic module 106 of the server 304 can determine whether the laptop computer 302 is operatively connected to the I/O interface 112 of the electronic device 104. If the diagnostic module 106 determines that the laptop computer 302 is not connected to the server 304, then the diagnostic module 106 may continue monitoring whether the laptop computer 302 is connected to the server 304.

With continuing reference to FIG. 4, at step 404 the method includes determining, at the diagnostic module, whether adequate electrical power is available from a power supply of the server. Returning to the aforementioned example, the diagnostic module 106 may be operatively connected to the power supply 128 for receipt of power to implement its functionality. The diagnostic module 106 may determine that the power supply 128 has failed or that it is otherwise not capable of providing sufficient power for the diagnostic module 106 to operate or at least communicate diagnostic information to the connected laptop computer 302. In response to determining that adequate power is available from a power supply of the server, the method may proceed to step 406. Otherwise, in response to determining that adequate power is unavailable from a power supply of the server, the method may proceed to step 408.

At step 406 of FIG. 2, the method includes using 406, at the diagnostic module, electrical power of the server to communicate the stored diagnostic information to the computer via the I/O interface. Continuing the aforementioned example, the diagnostic module 106 can use power provided by the power supply 128 to communicate the stored diagnostic information 108 to the laptop computer 302 via the cable 116 and the I/O interfaces 112 and 114.

At step 408 of FIG. 4, the method includes using, at the diagnostic module, electrical power from the computer to initiate a pre-boot kernel at the diagnostic module. Continuing the aforementioned example, power provided by the laptop computer 302 may be used to initiate the kernel 308 for operation on the processor(s) 111. As an example, the laptop computer 302 or other diagnostic equipment may send a control signal to the diagnostic module 106 for initiating a diagnostic process for the server 304 or other electronic device. The kernel 308 may be initiated in response to receipt of the control signal. Further, for example, the electrical power of the laptop computer 302 may be used to communicate the stored diagnostic information to the laptop computer 302 in response to receiving the control signal. In an example, a USB 2.0 system can provide 500 mA of power to the diagnostic module 106. In this example, as the diagnostic module 106 begins to load the pre-boot kernel it can establish communication to the laptop computer 302 using the USB data protocol. The kernel 308 can preset the total content of the log as file or a data device. This can be expressed on the laptop computer 302 via the user interface 124 by an application residing on the laptop computer 302.

Subsequent to step 408, the method includes reading 410, by command of the kernel, the diagnostic data. Continuing the aforementioned example, by command of the kernel 308 the diagnostic data 108 may be read from memory 108. For example, event log data 310 may be read from memory 110.

The method of FIG. 4 includes communicating 412, by command of the kernel, the diagnostic data. Continuing the aforementioned example, by command of the kernel 308 the diagnostic module 106 may communicate the read diagnostic data 108 to the laptop computer 302.

Subsequent to steps 406 and 412, the diagnostic equipment has received the stored diagnostic information. Following steps 406 and 412, the method includes presenting 414, at the computer, the diagnostic information. Continuing the aforementioned example, the diagnostic module 122 may control the user interface 124 to present the diagnostic information. For example, a display may be controlled to display the diagnostic information as text and/or graphically. After receiving the diagnostic information, the laptop computer 302 may request additional information and/or provide additional instructions to the diagnostic module 106. Further, the technician may physically disconnect the laptop computer 302 from the server 304 by disconnecting the cable from one or both of the I/O interface 112 and 114.

In accordance with embodiments, a power level supplied by an electronic device may be greater than a power level supplied by diagnostic equipment. For example, the power supply 128 of the server 304 may be operable to provide 12 Volts of power, while the laptop computer 302 can provide 5 Volts. In some instances, the power supply 128 of the server 304 may only supply 5 Volts or lower in the case of failure or other problem. The diagnostic module 106 may be configured to use implement the kernel 308 with both read/write functionality in the case of the electrical power supplied by the power supply of the electronic device being above a predetermined level.

FIG. 5 illustrates a flow diagram of an example method for initiating a kernel with different functionality for accessing diagnostic information based on power supply. The method is described as being implemented by the system 300 shown in FIG. 3, but it should be understood that the method may alternatively be implemented by any other suitable system. Particularly, the method of FIG. 5 is described by example as being implemented by the diagnostic module 106 of the server 304.

Referring to FIG. 5, the method includes determining 500 whether electrical power supplied for a diagnostic module of an electronic device is above a predetermined level. For example, subsequent to connection of the laptop computer 302 to the server 304, the diagnostic module 106 may determine whether electrical power supplied by the power supply of the electronic device above a predetermined level. As an example, the diagnostic module 106 may determine that the power supply 128 is supplying power at 12 Volts, which is above the predetermined level. In another example, the diagnostic module 106 may determine that the power is being supplied by the battery 306 of the laptop computer 302, and that this supplied power level of 5 Volts is less than the predetermined level.

The method of FIG. 5 includes initiating 502 full kernel for control of the electronic device by diagnostic equipment in response to determining that the electrical power supplied for the diagnostic module is above the predetermined level. Continuing the aforementioned example, the kernel 308 may provide read/write functionality for configuration of settings, managed by the diagnostic module 106, related to the diagnostic module 106 of the server system.

It is noted that a full kernel can allow for a user to make changes to settings such as the server boot order, out-of-band network configuration, power and performance settings, and the like. These settings may be stored on a non-volatile EEPROM device connected to the diagnostic module 106.

The method of FIG. 5 includes initiating 504 partial kernel for control of the electronic device by diagnostic equipment in response to determining that the electrical power supplied for the diagnostic module is not above the predetermined level. Continuing the aforementioned example, the kernel 308 may provide only read functionality for only allowing read of diagnostic information 108 such that it may be communicated to the laptop computer 302. In a partial kernel, the ability to make write changes to the non-volatile EEPROM may be limited or prevented. This can be a safety precaution to avoid making changes where the device may be in a state that it cannot safely record or distribute changes to hardware that does not have power.

In accordance with embodiments, a user interface of an electronic device may be configured to present diagnostic information to a user (e.g., a technician). A diagnostic module may control the user interface to present (e.g., display) diagnostic information stored in its memory. For example, the diagnostic module 106 shown in FIG. 3 may use electrical power supplied by the laptop computer 302 or other diagnostic equipment to power the user interface 124 for presenting the stored diagnostic information 108. The user interface 124 may be diagnostic light emitting diodes (LEDs).

In accordance with embodiments, diagnostic equipment may be configured to display an image representing an electronic device and an overlay of condition information via an augmented reality technique. FIG. 6 illustrates a flow diagram of an example method to display an image representing an electronic device and an overlay of condition information via an augmented reality technique. The method is described by example as being implemented by the diagnostic module 122 of the diagnostic equipment 102 shown in FIG. 1.

Referring to FIG. 6, the method includes receiving 600 diagnostic information. For example, the diagnostic equipment 102 may receive diagnostic information 108 from the electronic device 104 in accordance with embodiments disclosed herein. The diagnostic information 108 may be retrieved from the memory 110 and communicated to the diagnostic module 122.

The method of FIG. 6 includes determining 602 condition information based on the diagnostic information. Continuing the aforementioned example, the diagnostic module 122 may generate or otherwise acquire condition information based on the received diagnostic information 108. For example, condition information may indicate a failed component of the electronic device 104. In an example, condition information may review event log and/or sensor state to determine a specific component that is at fault. Further, in this example, the diagnostic may have information about the electronic device and available components and failure states. Further, for example, an Internet lookup may be performed to acquire condition information based on the diagnostic information 108.

The method of FIG. 6 includes displaying 604 an image representing the electronic device and an overlay of the condition information via an augmented reality technique. For example, a display of the diagnostic equipment 102 may display an overlay of an actual image of the electronic device 104 and/or a computer-rendering of a representation of the electronic device 104. Further, for example, the diagnostic equipment 102 may display an overlay on the display representation of the electronic device 104.

As described herein, an image representing the electronic device along with an overlay of condition information may be presented via an augmented reality technique. As an example, FIG. 7 illustrates a displayed representation of internal components of a server. Referring to FIG. 7, an overlay of an "X" 700 marking a failed electronic component is provided. This "X" 700 may be highlighted to a technician by a particular color (e.g., red), blinking, and/or any other suitable technique to mark the component.

As described herein, diagnostic equipment, such as diagnostic equipment 102 shown in FIG. 1, can present diagnostic information and/or condition information to its user. The diagnostic information may be presented via a display of the diagnostic equipment. FIG. 8 illustrates a screen display providing example diagnostic and condition information in accordance with embodiments of the present disclosure. In this example, the information is presented by text in a table format. The information includes system error log, last-known sensor readings, and last-known LED status information.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A system comprising:
    an input/output interface configured to communicatively connect to diagnostic equipment and configured to receive electrical power from the diagnostic equipment; and
    a diagnostic module configured to:
        store diagnostic information of an electronic device;
        determine that the diagnostic equipment is connected to the input/output interface;
        determine that electrical power available from a power supply of the electronic device is less than a predetermined power level; and
        in response to the diagnostic equipment being connected to the input/output interface and the electrical power available from the power supply of the electronic device being less than the predetermined power level, receive the electrical power from the diagnostic equipment, use the electrical power from the diagnostic equipment to access the stored diagnostic information, and use the electrical power from the diagnostic equipment to communicate the stored diagnostic information to the diagnostic equipment.

2. The system of claim 1, wherein the input/output interface is a universal serial bus (USB) interface.

3. The system of claim 1, wherein the diagnostic equipment is a computer, a smartphone, a router, a switch, a tablet computer, or a handheld electronic device configured to display the diagnostic information on a display.

4. The system of claim 1, wherein the diagnostic information includes event logs, metrics, temperature, voltage states, physical shock levels, humidity measurements, fault conditions, moisture exposure information, and/or state information of components of the electronic device.

5. The system of claim 1, wherein the electronic device comprises a server, a router, or a switch.

6. The system of claim 1, wherein a level of power supplied by the electronic device is greater than a level of power supplied by the diagnostic equipment.

7. The system of claim 1, wherein the diagnostic module is configured to initiate a kernel that accesses the stored diagnostic information and provides the stored diagnostic information for communication to the diagnostic equipment.

8. The system of claim 7, wherein the kernel is a limited functionality kernel that is primarily configured to read the stored diagnostic information.

9. The system of claim 7, wherein the diagnostic module is further configured to:
    determine that electrical power from the power supply of the electronic device is available above the predetermined power level; and
    in response to the electrical power from the power supply of the electronic device being available above the predetermined power level, initiate the kernel,
    wherein the kernel has read/write functionality for configuration of settings, managed by the diagnostic module, related to the diagnostic module or the system.

10. The system of claim 1, wherein the electronic device includes a user interface configured to present diagnostic information to a user, and
    wherein the diagnostic module is configured to use the electrical power supplied by the diagnostic equipment to power the user interface for presenting the stored diagnostic information.

11. The system of claim 1, wherein the diagnostic module is configured to:
    receive a control signal from the diagnostic equipment for initiating a diagnostic process for the electronic device,
    wherein communicating the stored diagnostic information to the diagnostic equipment is in response to receiving the control signal.

12. A method comprising:
    storing diagnostic information of an electronic device;
    determining that diagnostic equipment is connected to an input/output interface that communicatively connects to diagnostic equipment and that is configured to receive electrical power from the diagnostic equipment;
    determining that electrical power available from a power supply of the electronic device is less than a predetermined power level; and
    receiving the electrical power from the diagnostic equipment, using the electrical power from the diagnostic equipment to access the stored diagnostic information, and using the electrical power from the diagnostic equipment to communicate the stored diagnostic information to the diagnostic equipment in response to the diagnostic equipment being connected to the input/output interface and the electrical power available from the power supply of the electronic device being less than the predetermined power level.

13. The method of claim 12, wherein the input/output interface is a universal serial bus (USB) interface.

14. The method of claim 12, wherein the diagnostic equipment is a computer, a smartphone, a router, a switch, a tablet computer, or a handheld electronic device configured to display the diagnostic information on a display.

15. The method of claim 12, wherein the diagnostic information includes event logs, metrics, temperature, voltage states, physical shock levels, humidity measurements, fault conditions, moisture exposure information, and/or state information of components of the electronic device.

16. The method of claim 12, wherein the electronic device comprises a server, a router, or a switch.

17. The method of claim 12, wherein a level of power supplied by the electronic device is greater than a level of power supplied by the diagnostic equipment.

18. The method of claim 12, further comprising initiating a kernel that accesses the stored diagnostic information and provides the stored diagnostic information for communication to the diagnostic equipment.

19. The method of claim 18, wherein the kernel is a limited functionality kernel that is primarily configured to read the stored diagnostic information.

20. The method of claim 18, further comprising:
determining that electrical power from the power supply of the electronic device is available above the predetermined power level; and
initiating the kernel in response to the electrical power from the power supply of the electronic device being available above the predetermined power level,
wherein the kernel has read/write functionality for configuration of settings, managed by the diagnostic module, related to the diagnostic module or the system.

* * * * *